(12) United States Patent
Golowich et al.

(10) Patent No.: US 6,400,450 B1
(45) Date of Patent: Jun. 4, 2002

(54) METHOD OF QUALIFYING A MULTIMODE OPTICAL FIBER FOR BANDWIDTH PERFORMANCE

(75) Inventors: Steven Eugene Golowich, New Providence; William Alfred Reed, Summit, both of NJ (US); Albert John Ritger, Lawrenceville, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/527,928

(22) Filed: Mar. 17, 2000

(51) Int. Cl.[7] .............................................. G01N 21/00
(52) U.S. Cl. ..................................................... 356/73.1
(58) Field of Search .......................... 356/73.1; 385/12, 385/13, 27, 32, 124, 127, 140, 145; 372/72, 6; 65/378, 407

(56) References Cited

U.S. PATENT DOCUMENTS

| 4,286,979 A | | 9/1981 | Buckler et al. ................ 65/3 A |
| 4,339,174 A | * | 7/1982 | Levin |
| 4,804,248 A | * | 2/1989 | Bhagavatula |
| 4,912,523 A | * | 3/1990 | Refi et al. |

OTHER PUBLICATIONS

Miller, C. M., "Optical Fiber Splices and Connectors Theory and Methods", Marcel Dekker, Inc., N.Y., 1986, pp. 180–197.
Presby, H. M., et al., "Calculation of bandwitdh from index profiles of optical fibers. 2: Experiment", Applied Optics, vol. 18, No. 19, Oct. 1979, pp. 3249–3255.
Golowich, S. E., et al., "A New Modal Power Distribution Measurement To Characterize Sources For Multimode Optical Fiber LANs", Proc. Of the 33rd Annual Conf. On Information Sciences And Systems, Mar. 1999, pp. 207–212.

* cited by examiner

Primary Examiner—Frank G. Font
Assistant Examiner—Tu T Nguyen
(74) Attorney, Agent, or Firm—Michael A. Morra (57) ABSTRACT

A method is disclosed for qualifying a multimode optical fiber 150 for bandwidth performance when used with a particular laser source. The method combines the modal power distribution (MPD) excited by a particular laser source with the differential mode delay (DMD) characteristic of the fiber. The DMD of the fiber is measured by injecting test pulses into one end of the fiber and detecting the resulting output pulse(s) at the other end. The test pulses are adapted to excite only a small number of the modes supported by the fiber. The test pulses are scanned across the core of the fiber at close intervals with the output pulse(s) stored at each radial position. A weighted sum of the output pulses is formed to determine a time-domain impulse response, where the weighting used corresponds to the MPD excited by the laser source. Bandwidth is then determined by standard methods for transforming the impulse response into the frequency domain. In one embodiment of the invention, a weighted sum of the DMD data is used in the determination of bandwidth; whereas in another embodiment of the invention, a deconvolution algorithm is applied to the DMD data to obtain modal delay times for each of the mode groups of the fiber, which are then combined with the MPD excited by the laser source.

12 Claims, 4 Drawing Sheets

METHOD OF QUALIFYING A MULTIMODE OPTICAL FIBER FOR BANDWIDTH PERFORMANCE

TECHNICAL FIELD

This invention relates to an improved procedure for testing optical fiber for bandwidth performance and, more particularly, the bandwidth of a multimode fiber.

BACKGROUND OF THE INVENTION

Presently, there is a great deal of interest in optical local area networks (LANs) operating at speeds of one gigabit per second (Gb/s) or more. With a gigabit Ethernet standard now in place, this trend is expected to accelerate. In order to achieve high bit rates, these systems require lasers to launch the optical signals, with the leading candidates being vertical cavity surface emitting lasers (VCSELs) and Fabry-Perot (FP) lasers to keep costs down. Additionally, the fiber of choice is multimode fiber, both due to its ease of installation compared to singlemode fiber, and to retain the use of a large installed base of multimode fiber.

The transmission characteristics of a fiber are very much dependent upon the fiber's index of refraction configuration, and especially on its variation in the radial direction, An optical fiber may transmit light in multiple modes (electromagnetic configurations), or in only a single mode, depending upon the fiber's core size and index of refraction as well as the launch angle and wavelength of the light being transmitted. Multimode fibers typically have a radially graded index of refraction, although certain step-indexed radial configurations are suitable for the transmission of multiple modes. The radial gradation is used to minimize the "mode dispersion" pulse-broadening effect, which is due to different transmission paths associated with the each of the modes. For example, in step-index multimode fibers, lower-order modes are transmitted essentially down the center of the fiber, while higher-order modes are transmitted down the fiber along paths that oscillate back and forth from the center of the fiber core to its periphery. The longer optical path lengths associated with higher order modes generally result in longer transit times. A given pulse transmitted through the fiber is transmitted as a combination of many possible modes. Higher order modes arrive later than the lower order modes because they traverse longer path lengths. Consequently the width of the pulse is significantly broadened (i.e., spread out in time) and the bandwidth is, consequently, decreased. However, in a graded index multimode fiber, the index of refraction decreases at larger radii, and this results in increased velocity for the higher order modes that spend more of their time at the periphery of the fiber core. This increase in velocity tends to compensate for the longer path lengths of higher modes, and approximately equalizes the transit times associated with the various modes thereby minimizing the mode-dispersion effect. Therefore, the bandwidth of the multimode fiber is increased.

For the purpose of standardized measurement, a modal power distribution has been chosen that equally excites all modes in a fiber. This is known as the "overfilled launch" (OFL), and various standards bodies specify it's use in characterizing the fiber bandwidth for purposes of trade and commerce. (Historically, multimode fibers were used with light-emitting diodes (LEDs), which very nearly launch equal power into every mode.) It is expected that optical LANs of the future will employ multimode fiber with laser launches, which are far from overfilled. And while OFL has been successful at predicting the performance of fibers when used with LED sources, conventional bandwidth predictions using OFL are nearly useless for predicting the performance of optical fibers that are coupled to laser sources in high-bit-rate systems. Laser sources excite only some of the modes, and the resulting bandwidth of the fiber depends strongly on which modes are excited by a particular source, The effective bandwidth of a fiber, when used with a particular source, can be much higher or lower than that obtained with the OFL. In order to develop fast, reliable, low-cost systems, it is crucial to understand the behavior and predict the bandwidth of multimode fiber under restricted launch conditions. Accordingly, what is needed is a method of qualifying a multimode optical fiber for bandwidth performance when used with a laser source.

SUMMARY OF THE INVENTION

The present invention combines a known modal power distribution (MPD) excited by a laser source of optical power with the differential mode delay (DMD) characteristic of a multimode optical fiber in order to determine its effective bandwidth when used with the laser source. The "mode dispersion" is characterized by measuring the DMD of the fiber using light pulses that excite only a small number of the fiber's propagation modes. Light pulses are injected into one end of the fiber at various radial distances from its center, and differential delay data is obtained at the other end of the fiber. This data is combined with the MPD excited by the laser source to determine an impulse response. Standard methods are then used to transform the impulse response into the frequency domain to determine the power spectrum and, hence, the bandwidth of the multimode fiber. Advantageously, this technique for measuring the bandwidth of a multimode fiber predicts its performance more accurately than traditional OFL measurements.

In a first embodiment of the invention, the raw DMD data (time-domain traces) are individually weighted by the MPD excited by the laser source and superposed to determine the impulse response of the multimode fiber.

In a second embodiment of the invention, the delay times of the individual mode groups are extracted from the measured DMD data. The delay times are then deconvolved using a particular algorithm by a method in which the fiber modal delay times for the individual mode groups from the DMD data are obtained using a deconvolution algorithm. A Gaussian impulse response is assumed for each mode group. The group velocities, attenuation and intra-mode-group dispersion of each mode group of the fiber are determined by applying a deconvolution algorithm to the DMD data. These modal impulse responses can the be superposed, weighted by the MPD excited by the source,:to predict the impulse response of the fiber. Standard methods are then used to determine the bandwidth of the multimode fiber from the impulse response (i.e., map the time-domain response into the frequency domain).

In a preferred embodiment of the invention, the DMD measurement consists of scanning a singlemode fiber across the input end of the test fiber and launching a short pulse at each position. The total power at the output end of the fiber as a function of time is measured and stored.

In a preferred embodiment of the invention, a reverse DMD measurement is made to characterize a laser source. The reverse DMD measurement consists of launching short impulses from the source under study into a test fiber. A singlemode fiber is scanned across the output end of the test fiber and, at each position, power exiting the singlemode fiber is stored as a function of time.

BRIEF DESCRIPTION OF THE DRAWING

The invention and its mode of operation will be more clearly understood from the following detailed description when read with the appended drawing in which.

TERMINOLOGY (Terms, always consistent with such terms as commonly used in context of optical fiber, are sometimes more specific than in common usage.)

αprofile—Power law profile, which as defining the fiber core, follows the relationship $$n^2(r)=(n_{co}^{max})^2(1-2\Delta\cdot(r/a)^\alpha) \quad (1)$$

wherein:

n(r)=refractive index at radial position, r r=radial position as measured from the fiber axis $n_{co}^{max}$=maximum value of refractive index in the core $\Delta=(n_{co}^{max}-n_{cl})/n_{co}^{max}$ a=core radius Bandwidth—The bandwidth of an optical fiber is the difference in frequency between a pair of band-edge frequencies in the power spectrum characteristic of the fiber. This characteristic is a measure of the fiber's output power in response to an impulse launched at an input end of the fiber. Typically, the band-edge frequencies are located at the half-power (i.e., −3 dB) points of the spectrum.

Cladding—The entirety of the fiber outside the core—as in conventional terminology, referring to the inorganic glass cladding produced during fiber drawing as an integral part of the fiber—not including applied organic coating(s).

Core—Innermost region of the fiber with primary responsibility for guiding—constituted of material of greater index of refraction than that of the cladding within which it is enclosed. In a common structure, using silica-based fiber, a core of updoped material is enclosed within a cladding of constant, lower index than that at any radial position within the core. Characteristic fiber structures consist of a germania-doped silica core within a clad of undoped silica.

The radial dimension of the core is ordinarily considered to be the dimension from the center of the fiber to the radially-measured onset of material of index equal to or less than that of the outer cladding—i.e., of index equal to or less than the "predominant clad index" , $n_{cl}$. The core of a species of the inventive fiber—the "Type B" species—however, includes a negative discontinuity of index level as low as, or lower than, the predominant index of the clad. In such structures, the position of the discontinuity is enclosed within additional core material of index greater than that of the clad.

Degenerate (or Principal) Mode Group (or Grouping)—For all but the single-member fundamental mode group, constituted of separate member modes, initially of the same axial phase velocity—the term is also applied to such groupings after "splitting" in which member modal phase velocities are no longer the same. Groupings are constituted of a meridional and/or helical mode, together with one or more skew modes.

Differential Mode Delay (DMD)—Measure of the relative propagation delays among the various Modes of a lightwave traversing an optical fiber in its axial direction.

Modal Power Distribution (MPD)—The distribution of powers that an optical source launches into the modes of an optical fiber. A given laser will excite very similar MPDs in all similar fibers. For example, a given laser will excited similar MPDs in all multimode optical fibers having a core diameter of 62.5 micrometers (μm) but different MPDs in multimode fibers having a core diameter of 50 μm.

Mode—Independent, self-supporting, electromagnetic field, constituted of an electric field component and a magnetic field component, that propagates axially along an optical fiber independent of all other modes. Modes are identified in $LP_{n,m}$ nomenclature—in accordance with a convention for describing field shape of linearly polarized modes. In accordance with this nomenclature, "n" is the azimuthal mode number and "m" is the radial mode number. Consistent with common practice, the term is sometimes used as synonymous with "mode group" where suitable, e.g., where phase-velocity is described, and modal members of the group are of the same phase-velocity.

Mode Group (or Grouping)—Generally refers to "degenerate" mode group, also known as "principal" mode group (next definition).

Multimode fiber—Fiber of core size sufficient to support a plurality of bound modes—characteristically from several hundred to 2000 modes—in addition to the fundamental mode.

DETAILED DESCRIPTION

Multimode fibers that are used in local area network applications typically have a core diameters of 50 μm and 62.5 μm, and a maximum fractional index difference ($n_{core}-n_{cladding})/N_{core}$, which are 0.01 or 0.02 respectively. Moreover, multimode fiber is generally used at one of two operating wavelengths, λ=850 nanometers (nm) or 1300 nm. The index profiles are chosen to maximize the modal bandwidth, i.e. to minimize the spread in modal group velocities. The optimal profile shape depends on the exact dispersion characteristics of the doped silica comprising the fiber, but is very close to a parabola, i.e., an α profile where a is approximately equal to 2.

The propagating modes can be divided into degenerate mode groups (DMGs), which share a common phase velocity. For a multimode fiber having a core diameter of 50 μm, at λ1300 nm there are approximately 12 such mode groups, while there are approximately 18 at 850 nm. For a multimode fiber having a core diameter of 62.5 μm, at λ=1300 nm there are approximately 22 such mode groups, while there are approximately 32 at 850 nm. Random imperfections in the fiber can couple power between modes. In modern fiber, such coupling is very weak, i.e. little coupling between mode groups occurs over several kilometers, and even the modes within a mode group may not couple within a few hundred meters, although precise data is lacking.

A pulse launched into a given mode propagates at the group velocity of the mode, spreads out in time due to chromatic dispersion, and is gradually attenuated due to absorption, scattering and bend loss. When a group of modes is coupled, for example within a mode group, the pulses continually share power and ultimately merge into a single pulse, possibly broadened by modal, as well as chromatic dispersion. Hence, when a pulse of light is launched into a multimode fiber, the impulse response of the fiber is expected to be the superposition of pulses, depending on wavelength and mode coupling effects. In a high-bandwidth fiber, the group delays of the different modes will be very nearly the same, while in a low-bandwidth fiber the pulses will be spread out in time. This modal dispersion is generally the limiting factor in multimode fiber performance.

Differential Mode Delay

The most important characteristic of a fiber for LAN applications is its impulse response, which is determined by the characteristics of the both the source and the fiber. The source launches a distribution of power into the various modes of the fiber, and the pulses in the various modes propagate as discussed above. Propagation effects in fiber can be characterized by a differential mode delay (DMD) measurement, which ideally consists of launching a pulse successively into each mode of the fiber and measuring the resulting group velocity and attenuation. In practice, it is impossible to selectively launch a single mode; instead, groups of modes are excited. A common setup consists of measuring the impulse response of a multimode fiber under a Gaussian beam launch, as the beam is scanned across the end face of the multimode fiber. The DMD measurement is advantageously made on multimode fibers in which mode mixing is minimal. Obviously, if a particular group of modes is excited only later to lose its identity because of mode mixing, the efficacy of the measurement is lost, since DMD is a measure of the differential delay time among the particular groups of modes.

DMD measurements are known and described in the art. See, for example, U.S. Pat. No. 4,286,979; and D. Marcuse, *Principles of Optical Fiber Measurements*, Academic Press, New York, 1981, both of which are hereby incorporated by reference. Since the optimal index profile of a multimode fiber is nearly parabolic $$m/M = (r/\alpha)^2 \tag{2}$$

can be used to relate the mode group number m to the radius r at which the incident light beam enters the fiber parallel to its axis. The core radius of the fiber is $\alpha$, and M is the largest value that m can assume for guide modes. Moreover, a spot size $$w = \left(\frac{\lambda a}{n_1 \pi}\right)^{\frac{1}{2}} \left(\frac{1}{2\Delta}\right)^{\frac{1}{4}} \tag{3}$$

insures that the beam does not spread unnecessarily inside the fiber. In this formula, $n_1$ is the maximum refractive index, $\lambda$ the vacuum wavelength, and $\Delta = (n_1^2 - n_2^2)/2n_1^2$, with $n_2$ indicating the cladding refractive index. The parameter w describes the width of the incident laser beam, which is assumed to have Gaussian shape. The intensity of the light beam decreases to 1/e of its maximum value at the distance $w/\sqrt{2}$ from the maximum.

Differential mode delay data is obtained by exciting the multimode fiber with a restricted launch, which excites only a small portion of the modes of the fiber. The source used for excitation can be a single mode fiber or a Gaussian beam produced by a series of apertures and lenses. The source is first aligned with the center of the core of the fiber under test. An optical pulse is launched into the fiber, and the resulting output pulse is detected at the far end. In general, one injects a pulse with a single peak in time, and gets out a series of pulses at different times. The entire output pulse, with all its peaks is stored. Then the source is scanned across the core of the fiber under test at close intervals until the source reaches the cladding, with the output pulse stored at each radial position. Alternatively, one may scan across the core of the fiber from clad to clad, passing through the center of the core.

Figure 1:
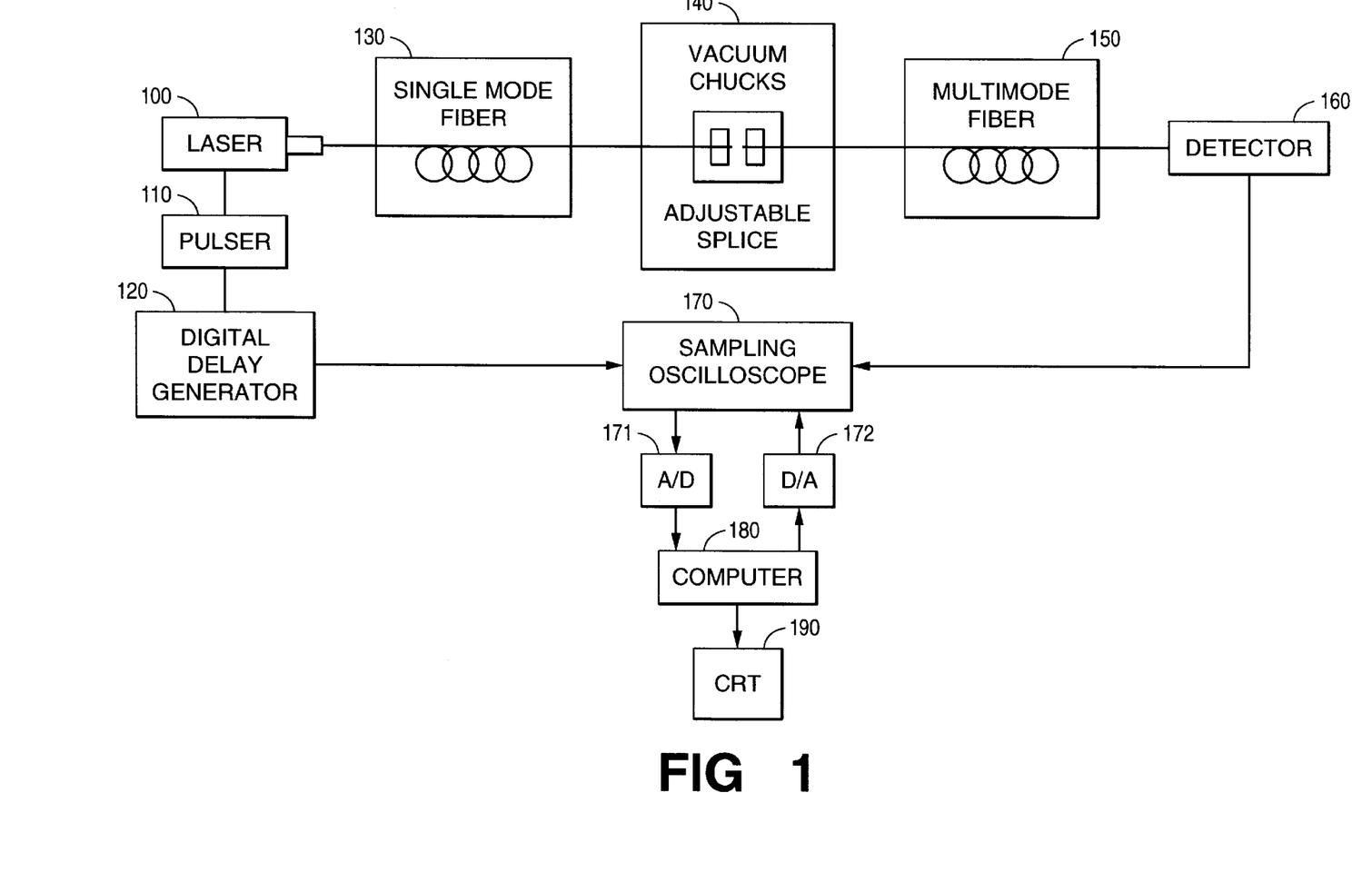
FIG. 1 is a block diagram of a differential mode delay (DMD) measurement system, which is suitable for use in the present invention.

An exemplary arrangement for making differential mode delay (DMD) measurements is shown in FIG. 1 and disclosed in U.S. Pat. No. 43,286,979 which is hereby incorporated by reference. Briefly, the arrangement comprises a laser 100, operating at 850 nanometers (nm) is pulsed at a 25 kHz repetition rate by a pulser 110, where the pulser clock signal also time synchronizes the measurement system through a very stable (approximately±10 ps jitter) digital delay generator 120. This enhanced stability of the timing path is particularly important when measuring very small differences in delay time. The output of the laser 100 is connected to a one meter length of singlemode fiber 130, which has a spot size of approximately 7 $\mu$m that is suitable for selectively exciting different mode subgroups in a multimode fiber 150. Selective excitation is achieved by splicing the singlemode fiber 130 directly to an unknown multimode fiber 150 using an adjustable splice 140 where the fiber ends are held in position adjustable (micromanipulator) vacuum chucks. End effects are reduced by using index-matching oil in the adjustable splice 140.

The multimode fiber output signals are detected by detector 160 using a silicon avalanche photodiode at wavelengths below 900 nm and a germanium avalanche photodiode at longer wavelengths. A sampling oscilloscope 180, triggered by the essentially jitter-free output of the digital delay generator 120, is used to measure the photodiode output thereby increasing the measurement range and accuracy. A computer 180 is used to sweep the oscilloscope 170 a number of times so that an average reading can be made thereby reducing amplitude and time uncertainties and allowing for measurement of low-level signals which occur near the core-cladding boundary of the multimode fiber 150. Analog-to-digital (A/D) converter 171 and digital-to-analog (D/A) converter 172 make the appropriate signal conversions between the digital computer 180 and the sampling oscilloscope 170.

After precise alignment and initial positioning of the adjustable splice, translation in one direction is used to vary the radial alignment of the single mode fiber launch into the multimode fiber under test.. With high precision micropositioners the radial resolution is on the order of 100 nm. For each selection of radial position n measurements are taken and an averaged pulse shape is stored in the computer 180 and, optionally, displayed on CRT 190. The output pulses corresponding to different r-values are thus observed, and the time shift of the peak of the pulses as a function of radial position is measured. As discussed above, for a small spot size, the mode group number m of a near-parabolic fiber is approximately given as $m/M = (r/\alpha)^2$.

Modal Power Distribution

The distribution of powers that a source launches into the modes of a fiber is known as its modal power distribution (MPD). The fields of some sources (for instance, the output of single transverse mode lasers, which are generally Gaussian beams) are known theoretically, so the coupling amplitudes of the modes of a given fiber can be computed. The MPDs excited by other sources must be characterized experimentally. The TIA standard method for measuring MPD involves processing a near-field intensity image of the endface of the target fiber under the desired launch (see TIA/EIA TSB62-3, 1995).

Figure 2:
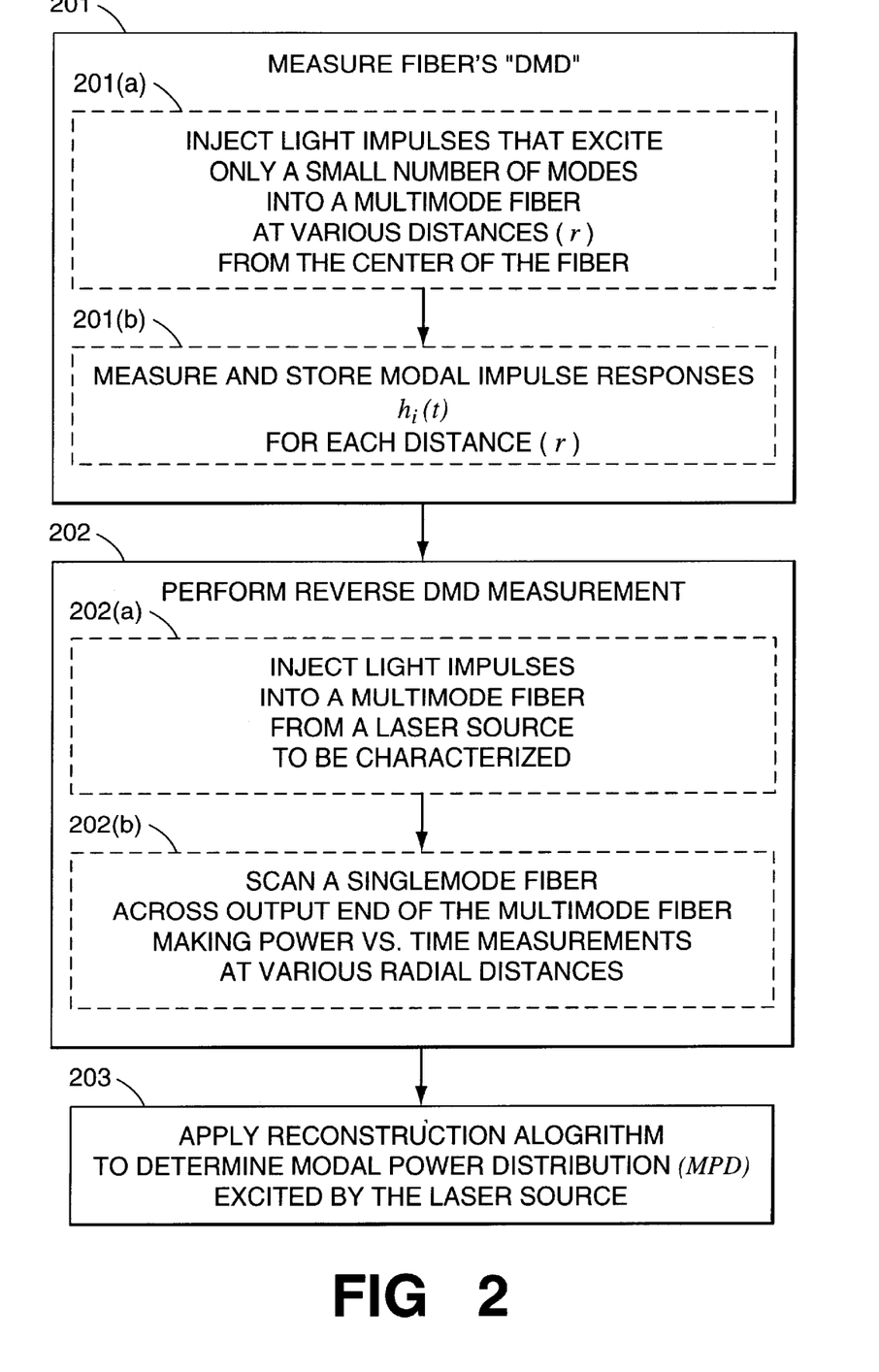
FIG. 2 discloses a flow diagram illustrating a method for determining the modal power distribution (MPD) excited by a laser source.

In preferred embodiments of the invention, a reverse DMD measurement is performed to characterize the MPD excited by the laser source. As indicated in FIG. 2, step 201 discloses a general technique for measuring a fiber's DMD. Step 201 includes step 201(*a*) in which light impulses, which are adapted to excite only a small number of modes, are injected into a multimode fiber at various distances (r) from the center of the fiber; and step 201(*b*) in which the time-domain responses to these impulses are measured and stored (optical power vs. time). In step 202, a reverse DMD measurement is made to characterize the MPD excited by the laser source. Step 202 includes step 202(*a*) in which light impulses from a laser source to be characterized are injected into a test multimode fiber; and step 202(*b*) in which a singlemode fiber is scanned across the output end of the test multimode fiber to make optical power vs. time measurements at various radial distances from the center of the multimode fiber. In step 203, the MPD excited by the source is then reconstructed from the forward and reverse DMD measurements. A suitable MPD reconstruction algorithm is described in *A New Modal Power Distribution Measurement to Characterize Sources for Multimode Optical Fiber LANs, Proceedings of the Thirty-Third Annual Conference on Information Sciences and Systems*, Johns Hopkins University, Baltimore, Md., presented on Mar. 17–19, 1999 which is hereby incorporated by reference. In general, the resolution of MPD measurements are such that they can measure only the power launched into the principal mode groups of a multimode fiber, not that launched into the individual modes.

One may find that weights, $c_i$, associated with the MPD as follows. Suppose that the Gaussian beam DMD launches at positions x, relative powers, $P_i^{smf}(\mu)$ into the various mode groups $\mu$ of the fiber, $P_{source}(\mathbf{82})$ is the MPD excited by the source of interest, and that $h_i(t)$ are the deconvolved impulse responses of the fiber under Gaussian beam launches a positions $x_i$. Then the MPD excited by the source can be approximated as $$P_{source}(\mu) = \sum_i c_i P_i^{smf}(\mu) \tag{4}$$

Where the $c_i$ may be found by constrained least squares:

$$\min_{c_i \geq 0} \sum_\mu \left( P_{source}(\mu) - \sum_i c_i P_i^{smf}(\mu) \right)^2 \tag{5}$$

Such a constrained least squares fit can be done by a constrained quadratic programming algorithm, implementations of which are available (see, for example, Port Mathematical Subroutine Library at http://www.bell-labs.con/project/PORT/).

The present invention relates to the combining of the MPD excited by a source with the DMD measurement to determine the impulse response and, hence, the bandwidth of the fiber under the source. Two methods for determining the impulse response are disclosed. Briefly, the first is to form the optimal linear combination of the measured DMD impulse responses; and the second involves spatially deconvolving information about the individual mode groups of the multimode fiber from the DMD data. These time-domain impulses responses are weighted according to the MPD excited by the laser source, which will be used with the multimode fiber, and then converted into the frequency domain for bandwidth determination.

Superposition of DMD Traces

Figure 3:
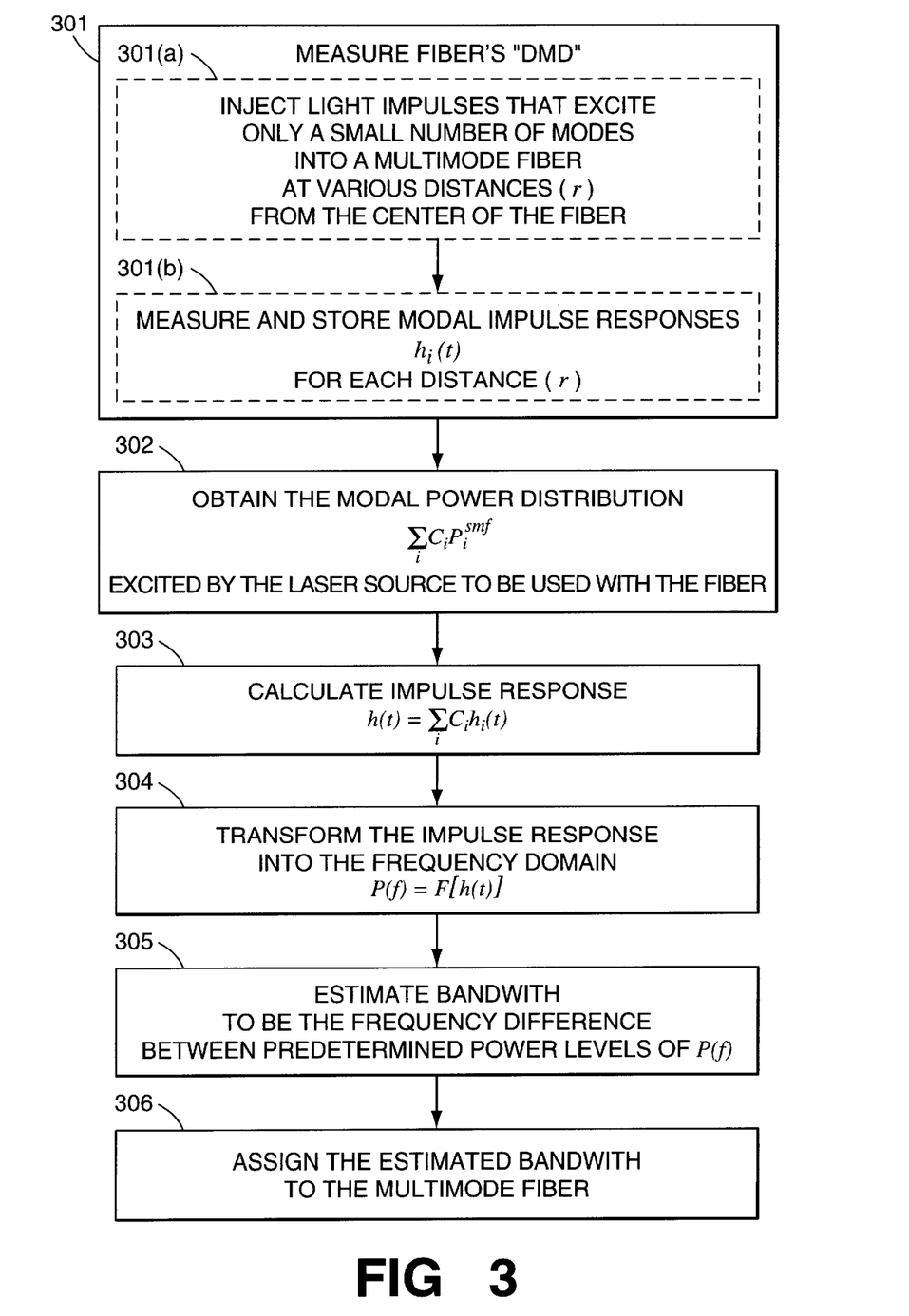
FIG. 3 discloses a flow diagram illustrating a method for determining bandwidth of a multimode fiber using DMD data in accordance with the invention.

FIG. 3 illustrates the first embodiment of the invention in which a DMD of the multimode fiber is made. The result of the DMD measurement is the response of a fiber to a series of Gaussian beam pulsed launches; the finite width of the input pulse can be deconvolved from the measured traces to yield the impulse response of a fiber under each of the Gaussian beam launches. Therefore, the response of the fiber to any launch that is well approximated by an incoherent superposition of the Gaussian beams is easily computed as the appropriately weighted superpositions of deconvolved DMD traces.

Figure 4:
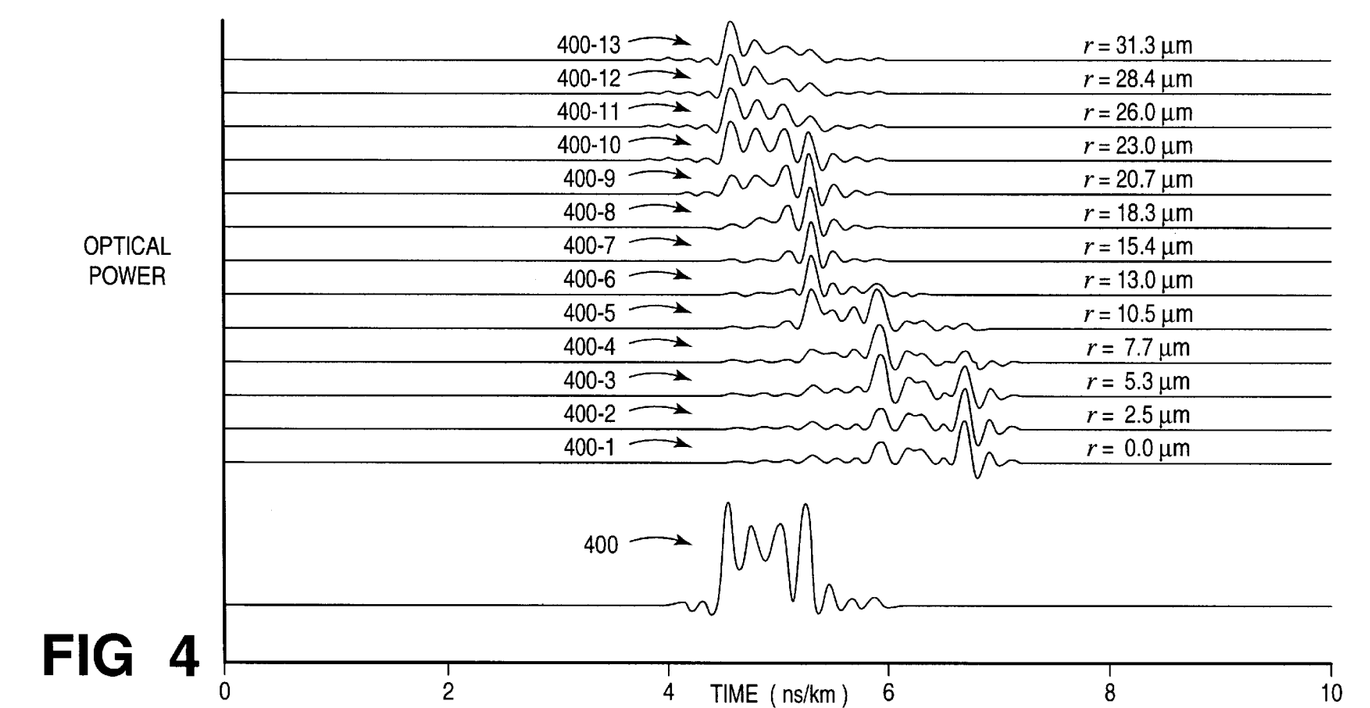
FIG. 4 shows a plurality of individual output responses to light impulses injected into a multimode fiber at various distances from the center of the fiber, and a impulse response formed by weighting the individual output responses according to the MPD excited by the laser source.

Step 301 discloses a general technique for measuring a fiber's DMD. Step 301 includes step 301(*a*) in which light impulses, which are adapted to excite only a small number of modes, are injected into a multimode fiber at various distances (r) from the center of the fiber; and step 301(*b*) in which the time-domain responses to these impulses are measured and stored (optical power vs. time). FIG. 4 illustrates the situation whereby light impulses are injected into the multimode fiber at radial distances (r) from 0.0 $\mu$m to 31.3 $\mu$m. The corresponding responses to these impulses are time-domain signals 400-1 to 400-13, which show the output power vs. time plot for each input impulse.

Step 302 relates to obtaining the MPD excited by the laser source to be used with the fiber, which was disclosed in connection with FIG. 2. This step need not be performed at this particular time and may already be available from the manufacturer of the laser source. Nevertheless, the MPD is now used to calculate an impulse response h(t) according in step 303 wherein:

$$h(t) = \sum_i c_i h_i(t); \tag{6}$$

The impulse response is shown in FIG. 4 as time-domain signal 400.

If the fit in equation (5) is good, then this method works well. However, there exist launch conditions, for instance, some on-axis spatially coherent launches, which cannot be characterized by a positive linear combination of superposed mode field launches.

Figure 5:
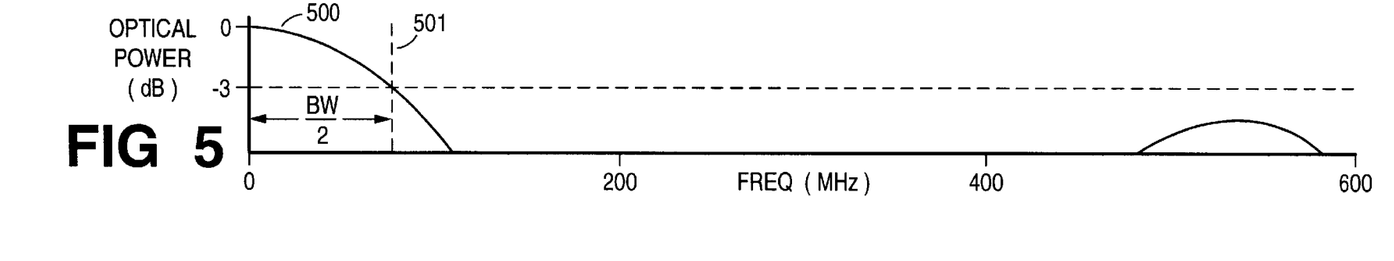
FIG. 5 discloses the frequency-domain representation of the impulse response shown in FIG. 4.

In step 304, the impulse response is transformed into the frequency domain by well-known techniques, such as Fourier transformation to produce a power spectrum for the multimode fiber such as shown in FIG. 5. Here, that portion of the spectrum designated 500 is used to estimate bandwidth (BW), according to step 305, between a first band-edge frequency 501 and a second (mirror image) band-edge frequency, which is not shown. The band-edge frequencies correspond to the frequencies where the power of spectrum 500 is 3 decibels (dB) below the maximum power level. This is also known as the half-power point. Nevertheless, bandwidth may also be specified based on the frequencies where the power is greater than or less than 3 dB.

Using Fourier transformation, the power content, $S^2(\omega)$, of the time-domain waveform h(t) can be expressed as $$S^2(\omega) = a^2(\omega) + b^2(\omega) \tag{7}$$

where $a(\omega) = \int_{-\infty}^{+\infty} h(t) \cos \omega t \, dt$; and $b(\omega) = \int_{-\infty}^{+\infty} h(t) \sin \omega t \, dt$ We can regard $S(\omega) \, d\omega/\pi$ as the amplitude of the spectral component at frequency $\omega$.

Finally, the above-estimated bandwidth is assigned to the multimode fiber as indicated in step 306. It is important for the multimode fiber to be qualified for bandwidth performance for use with a laser source.

Spatial Deconvolution of DMD Data

A second method for predicting impulse response involves carefully analyzing the DMD data to extract the mean group velocities of the principal mode groups, along with their attenuations and intra-mode-group dispersions. Assuming a Gaussian impulse response of each mode group, this information is sufficient to characterize the impulse response of each mode group. These modal impulse responses can then be superposed, weighted by the MPD excited by the source, to predict the impulse response of the fiber.

Extracting the characteristics of each mode group from the DMD data $h_i(t)$ amounts to deconvolving the blurring effect of using Gaussian beams to selectively excite the mode groups of the fiber. We assume that the impulse response $h_{PMG}$ of each mode group $\mu$ can be approximated as $$h_{PMG}(t, \tau_\mu, \gamma_\mu, \sigma_\mu) = \frac{1}{\sqrt{2\pi}\sigma_\mu} \exp\left[-\gamma_\mu z - \frac{1}{2\sigma_\mu^2}(t - \tau_\mu z)^2\right] \quad (8)$$

where $\tau_\mu$ is the delay per unit length (inverse group velocity) of mode group $\mu$, $\gamma_\mu$ is its attenuation, and $\sigma_\mu$ is its pulse width. The DMD data can then be modeled as $$h_i(t) = \sum_\mu P_i^{smf}(\mu) h_{PMG}(t, \tau_\mu, \gamma_\mu, \sigma_\mu) \quad (9)$$

The parameters $\tau_\mu$, $\gamma_\mu$, and $\sigma_\mu$ of equation (8) may be fit by nonlinear least squares. Once the parameters are known, the impulse response of the fiber is given by $$h(t) = \sum_\mu P_{source}(\mu) h_{PMG}(t, \tau_\mu, \gamma_\mu, \sigma_\mu) \quad (10)$$

Unlike the Superposition of Traces method, this method for predicting impulse response works equally well for any launch MPD. For example, it can handle on-axis spatially coherent launches, which are not well approximated by the incoherent superposition of Gaussian beams. However, it is limited by the fact that the nonlinear model (9) must be fit.

Although various particular embodiments of the present invention have been shown and described, modifications are possible within the scope of the invention. These modifications include, but are not limited to: the use of other methods for measuring the fiber's DMD such as a lens rather than a singlemode fiber to excite only a small number of modes of the fiber; and the use of other methods to measure the MPD excited by the laser source; and the use of other time-domain to frequency-domain conversion techniques other than fourier transforms.

What is claimed is:

1. A method of qualifying a multimode optical fiber for bandwidth performance when used with a laser source that excites a modal power distribution (MPD) comprising an optical power in various mode fields of the multimode optical fiber, said multimode fiber having a core surrounded by a cladding and having an input end and an output end, the method comprising the following steps:

measuring a differential mode delay (DMD) characteristic of the multimode fiber;

combining the MPD excited by the laser source with the DMD of multimode fiber to estimate the fiber's impulse response;

performing a time-domain-to-frequency-domain transformation of the impulse response to determine the distribution of optical power as a function of frequency; and assigning a measure of bandwidth performance to the multimode fiber, said measure being the frequency difference between a pair of band-edge frequencies where the magnitude of the optical power distribution is less than the maximum magnitude of the optical power distribution by a predetermined amount.

2. The method of claim 1 wherein the modal power distribution (MPD) excited by the laser source is approximated as $$P_{source} \cong \sum_i c_i P_i^{smf}.$$

3. The method of claim 2 wherein the step of measuring the differential mode delay (DMD) of the optical fiber comprises the following steps:

injecting light impulses into the input end of the optical fiber at various radial distances from the center of the core, said light impulses being adapted to excite only a small number of modes of the fiber;

detecting impulse response data, $h_i(t)$, at the output end of the fiber for impulses injected at each of the various radial distances, said impulse response data comprising magnitude and propagation delay of the light impulses; and storing the impulse response data.

4. The method of claim 3 wherein the step of combining the MPD excited by the laser source with the DMD of multimode fiber to obtain an impulse response comprises calculating the impulse response, $h(t)$, of the multimode fiber according to the formula:

$$h(t) = \sum_i c_i h_i(t).$$

5. The method of claim 3, wherein the step of injecting light impulses into the multimode fiber includes the steps of:

interconnecting a laser light source to one end of a singlemode fiber;

adjustably coupling the other end of the singlemode fiber to the input end of the multimode fiber; and moving the singlemode fiber, relative to the multimode fiber, from the center of the multimode fiber core toward the cladding.

6. The method of claim 1 wherein the optical power at the band-edge frequencies is about three decibels below the maximum magnitude of the optical power distribution.

7. The method of claim 2 wherein the modal power distribution (MPD) excited by the laser source is determined by the following steps:

measuring a differential mode delay (DMD) characteristic of a test fiber having a core surrounded by a cladding and having an input end and an output end;

launching short optical pulses from the laser source into the input end of the test fiber;

scanning the output end of the test fiber at various radial distances from the center thereof;

measuring optical power at each of the radial distances from the center of the test fiber; and applying a reconstruction algorithm to determine the MPD excited by the laser source.

8. The method of claim 7 wherein the step of scanning the output end of the test fiber at various radial distances includes the steps of adjustably coupling one end of a singlemode fiber to the output end of the test fiber; and moving the singlemode fiber, relative to the test fiber, from the center of the test fiber core toward the cladding.

9. A method of qualifying a multimode optical fiber for bandwidth performance when used with a laser source that excites a modal power distribution (MPD) comprising an optical power in its various mode fields $$\left(i.e., P_{source} \cong \sum_i c_i P_i^{smf}\right),$$

said multimode fiber having a core surrounded by a cladding and having an input end and an output end, the method comprising the following steps:

injecting light impulses into the input end of the optical fiber at various radial distances from the center of the core, said light impulses being adapted to excite only a small number of modes of the fiber;

detecting impulse response data, $h_i(t)$, at the output end of the fiber for impulses injected at each of the various radial distances, said impulse response data comprising magnitude and propagation delay of the light impulses;

storing the impulse response data;

calculating an impulse response, h(t), of the multimode fiber according to the formula:

$$h(t) = \sum_i c_i h_i(t);$$

performing a time-domain-to-frequency-domain transformation of the impulse response, h(t), to determine the distribution of optical power as a function of frequency; and assigning a measure of bandwidth performance to the multimode fiber, said measure being the frequency difference between a pair of band-edge frequencies where the magnitude of the optical power distribution is less than the maximum magnitude of the optical power distribution by a predetermined amount.

10. The method of claim 9, wherein the step of injecting light impulses into the multimode fiber includes the steps of:

interconnecting a laser light source to one end of a singlemode fiber;

adjustably coupling the other end of the singlemode fiber to the input end of the multimode fiber; and moving the singlemode fiber, relative to the multimode fiber, from the center of the multimode fiber core toward the cladding.

11. A method of qualifying a multimode optical fiber for bandwidth performance when used with a laser source that excites a modal power distribution (MPD) comprising an optical power in various mode fields of the multimode optical fiber, said multimode fiber having a core surrounded by a cladding and having an input end and an output end, the method comprising the following steps:

measuring a differential mode delay (DMD) characteristic of the multimode fiber;

estimating from DMD data the delays, $\tau_\mu$, attenuations $\sigma_\mu$ and pulse widths, $\gamma_\mu$, of each mode group $\mu$;

predicting the impulse response, h(t), of the fiber under excitation by a source with MPD, $P_{source}(\mu)$, according to the equation:

$$h(t) = \sum_\mu P_{source}(\mu) h_{PMG}(t, \tau_\mu, \gamma_\mu, \sigma_\mu);$$

performing a time-domain-to-frequency-domain transformation of the impulse response to determine the distribution of optical power as a function of frequency; and assigning a measure of bandwidth performance to the multimode fiber, said measure being the frequency difference between a pair of band-edge frequencies where the magnitude of the optical power distribution is less than the maximum magnitude of the optical power distribution by a predetermined amount.

12. The method of claim 11, wherein the step of injecting light impulses into the multimode fiber includes the steps of:

interconnecting a laser light source to one end of a singlemode fiber;

adjustably coupling the other end of the singlemode fiber to the input end of the multimode fiber; and moving the singlemode fiber, relative to the multimode fiber, from the center of the multimode fiber core toward the cladding.

* * * * *